March 14, 1961 V. J. LUNDELL 2,974,468
AERATING WINDROW ATTACHMENT FOR HAY CHOPPERS
Filed May 22, 1957 2 Sheets-Sheet 1

INVENTOR.
Vernon J. Lundell
BY
Sam J. Slotsky
ATTORNEY

March 14, 1961 V. J. LUNDELL 2,974,468
AERATING WINDROW ATTACHMENT FOR HAY CHOPPERS
Filed May 22, 1957 2 Sheets-Sheet 2

INVENTOR.
Vernon J. Lundell
BY
*Sam J. Slotsky*
ATTORNEY

United States Patent Office 2,974,468
Patented Mar. 14, 1961

2,974,468

AERATING WINDROW ATTACHMENT FOR HAY CHOPPERS

Vernon J. Lundell, Cherokee, Iowa

Filed May 22, 1957, Ser. No. 660,803

2 Claims. (Cl. 56—24)

My invention relates to an aerating windrow attachment for hay choppers.

An object of my invention is to provide an attachment used in combination with a certain hay chopper of my invention whereby this attachment will provide means for depositing the chopped crop or hay into a windrow.

A further object of my invention is to provide such an arrangement which can be swung to one side or the other whereby the windrows can be placed at desired spacings, or directly adjacent to each other.

A further object of my invention is to provide an arrangement in which a core, or hollow space, is provided as the chopped material is carried to the windrow, so that the windrow will be completely aerated, resulting in quicker curing or drying.

A further object of my invention is to provide means whereby the unit can be swung from side to side from the tractor seat when such is desired.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1:
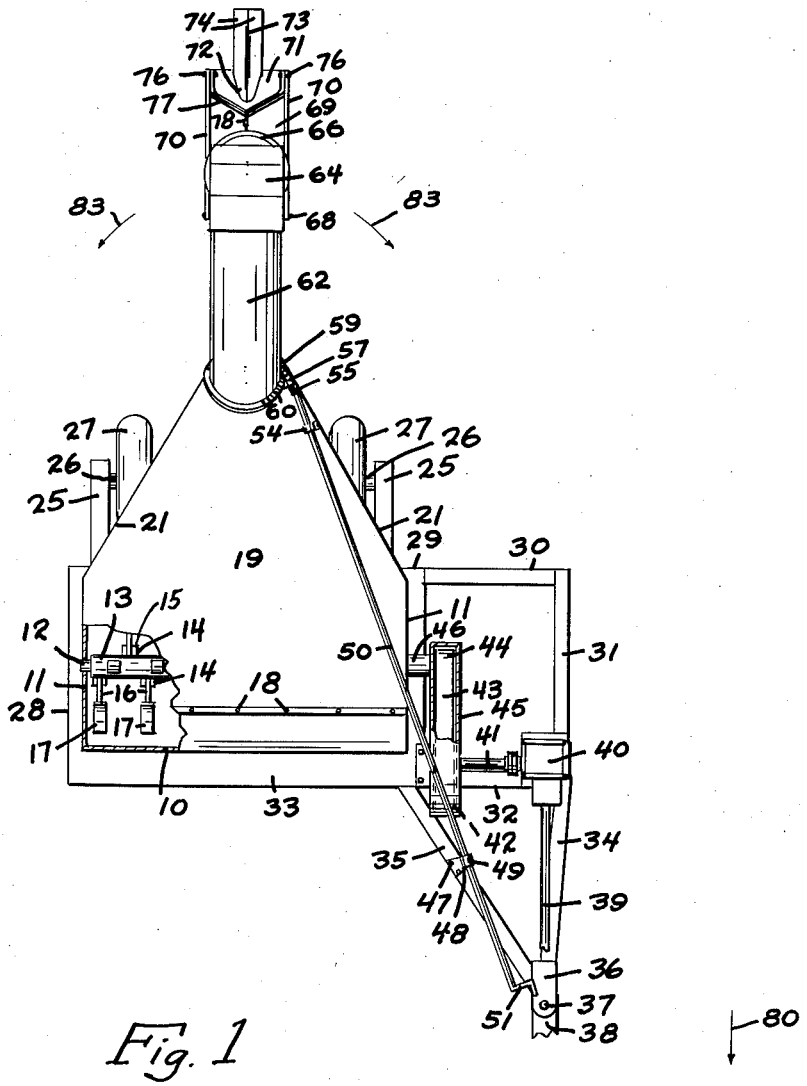
Figure 1 is a plan view of the machine with parts broken away.

My present invention relates to an attachment for, and an improvement on, my patent on a Hay Chopper and Discharge Spout Therefor, No. 2,786,317, issued March 26, 1957, with the hay chopper parts to be described being further described in the aforesaid patent.

The character 10 designates a substantially semi-cylindrical casing having the end walls 11. Journalled in the end walls 11 is a shaft 12 to which it attached the pipe 13. Attached to the pipe 13 are the lugs 15 to which are pivotally attached at 14 the hammers 16 terminating in the arcuate cutting or chopping member 17, these various members being described in the aforesaid patent. Attached at 18 to the casing 10 is an upwardly extending angularly inclined discharge spout having the upper and lower walls 19 and 20 respectively, and side walls 21, the spout being braced by means of a suitable brace 22. Attached at 23 to the framework portion 24 are the angularly and downwardly extending supports 25 to which are journalled at 26 the wheels 27.

Attached to and extending from the casing 10 are the other framework portions 28, 29, 30, 31, 32, and 33, and attached to certain of these portions are the further braces 34 and 35, to which is attached the clevis 36 which is pinned at 37 to a tractor (not shown) draw-bar 38, the character 39 indicating the tractor drive shaft which passes within the casing 40 having suitable meshing gears (not shown) which drive the further shaft 41 which is attached to a larger pulley 42, and passing over the pulley 42 is a belt 43 which passes over a smaller pulley 44, which pulley 44 is attached to the shaft 12 to thereby rotate the hammers 16 and 17, the pulleys 42 and 44 being enclosed within a casing 45, the character 46 indicating a small casing enclosing the other end of the shaft 12.

Attached at 47 to the framework portion 35 is a vertically positioned lengthened bracket 48 terminating in the bearing 49, in which bearing is received the lengthened rod 50 having the turning handle 51, and attached at 52 to the upper wall 19 is a further bracket 53 having the journalling portion 54 which also receives the rod 50, the rod 50 being attached to a small universal joint 55 which drives the small shaft 56 which is journalled in a bearing 57 which is attached to the lower stationary ring 58, and attached to the shaft 56 is a small worm 59 which engages the worm gear 60, which is secured to the upper ring 61, which upper ring partially is received within the lower ring 58 and to thereby rotate therein, the ring 61 being suitably flanged whereby the upper chute structure about to be described will be held in place.

Secured to the upper ring 61 is a chute portion 62 to which is attached at 63 the further chute member 64 terminating in the downwardly extending portion 65 to which is secured at 66 the cylindrical vertically positioned pipe 67.

Attached forwardly of the pipe 67 is a transverse rod 68 to which is pivoted an angularly extending further chute 69 having the sides 70, which chute 69 extends into the arcuate portion 71. Attached to the arcuate portion 71 at 72 is the apex portion 73 of a hollow triangular-shaped member having the side walls 74 and the bottom wall 75.

Pivotally attached at 76 to the side walls 70 is a yoke 77 to which is attached the chain 78 which is attached at 79 to the pipe 67.

Figure 2:
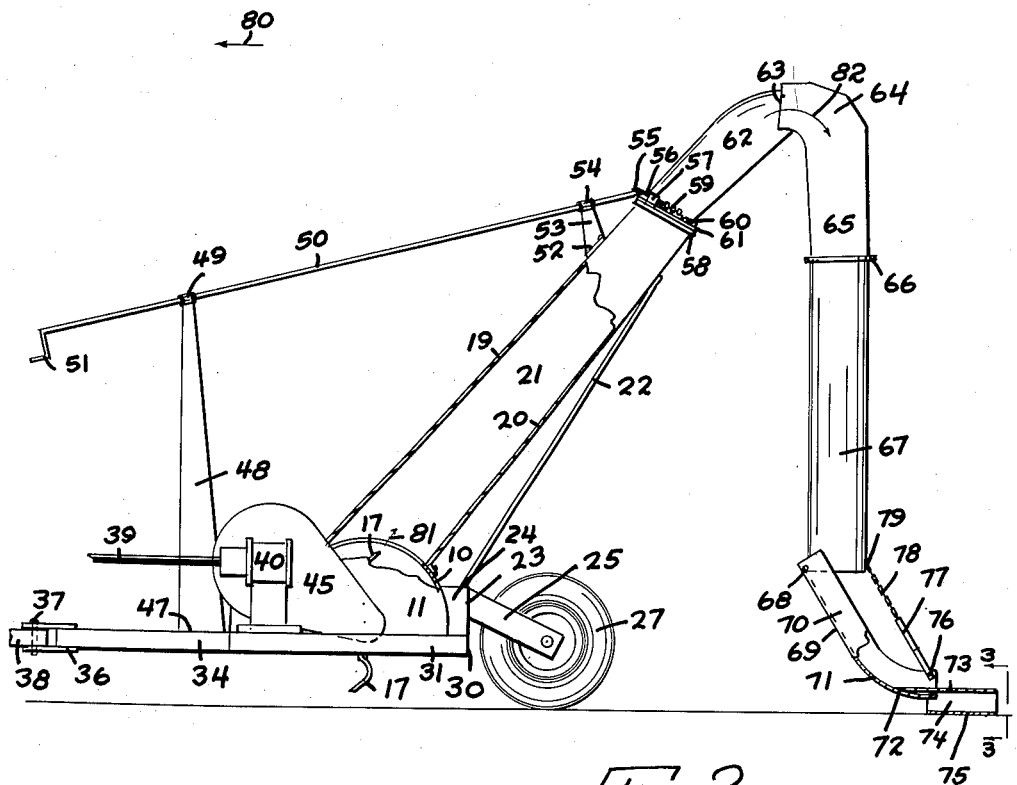
Figure 2 is a side elevation of Figure 1 with parts shown in section.
Figure 3:
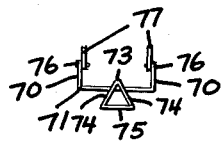
Figure 3 is an end view of Figure 2 as observed along the lines 3—3 of Figure 2.

The device operates in the following manner. As the tractor draws the arrangement in the direction of the arrow 80, the power applied through the shaft 39 is adapted to rotate the hammers 17, to thereby efficiently cut and chop the standing crop in the field, and which is thoroughly explained in my patent above mentioned, this crop being impelled in the direction of the arrow 81 (see Figure 2) upwardly through the chute, which crop will then trvael in the direction of the further arrow 82 and will then fall downwardly through the tubular member 67 into the inclined chute 69 and thence out of the end of the chute 69, to thereby form a windrow along the field as the unit travels forwardly.

It will be noted that as the chopped material passes out of the end of the chute 69, it will be separated by means of the triangular-shaped member 74, 75 with the windrow also falling above this member, so that as a result a hollow core will be provided directly in the windrow, thereby providing an increased area of contact with the air in the hollow core, which will cause more effective curing or drying of the crop in the windrow.

It will be noted that since the chute 69 can pivot at 68, the device will travel along the ground regardless of the humps and contours.

By rotating the handle 51 from the tractor seat, the engagement of the worm 59 with the worm gear 60 will cause the upper chute members 62, 65 and 67 as well as the chute 69 to rotate in either direction as indicated by the character 83 in Figure 1, so that the windrow can be deposited to either side as desired.

For instance, as the unit travels through the field and thence returns to cut an adjacent row, by merely rotating the rod 50 with the handle 51, the windrows can be placed directly adjacent to each other so that two windrows can be gathered at one time.

It will now be seen that I have provided the advantages mentioned in the objects of my invention, with further advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A crop handling machine comprising a semi-cylindrical casing having its concavity facing downwardly and disposed transversely of the line of travel, a framework to which said casing is secured, a rotating chopping and gathering structure journalled in said casing and substantially coaxial therewith for chopping and gathering standing crops, and including a plurality of radially positioned hammers, an upwardly and rearwardly inclined chute communicating through the top of said casing, a further chute communicating with said upwardly extending chute, said further chute being positioned substantially vertically whereby a chopped crop delivered by said crop handling machine will pass downwardly to provide windrows, means connected to and for rotating said further chute whereby said windrows can be selectively directed laterally with respect to said chute, a still further chute pivotally secured to said further chute, a core-forming member attached to said still further chute, said core-forming member being hollow to provide means whereby material passing about said core-forming member will provide a hollow air core in said windrows.

2. A crop handling machine comprising a semi-cylindrical casing having its concavity facing downwardly and disposed transversely of the line of travel, a framework to which said casing is secured, a rotating chopping and gathering structure journalled in said casing and substantially coaxial therewith for chopping and gathering standing crops, and including a plurality of radially positioned hammers, an upwardly and rearwardly inclined chute communicating through the top of said casing, a further chute communicating with said upwardly extending chute, said further chute being positioned substantially vertically whereby a chopped crop delivered by said crop handling machine will pass downwardly to provide windrows, means for rotating said further chute whereby said windrows can be selectively directed laterally with respect to said chute, a still further chute pivotally secured to said further chute, a core-forming member attached to said still further chute, said core-forming member being hollow to provide means whereby material passing about said core-forming member will provide a hollow air core in said windrows, the direction of rotation of the ends of said radially positioned hammers being such that when chopping said crops approximately at ground level or thereabove, said ends will travel in the same direction as that in which said crop handling machine is travelling, whereby said chopped crop will be impelled directly from said hammers upwardly into said chute.

References Cited in the file of this patent

UNITED STATES PATENTS

| | | |
|---|---|---|
| 1,100,959 | Dick | June 23, 1914 |
| 1,216,342 | Merwin | Feb. 20, 1917 |
| 2,010,312 | McIntire | Aug. 6, 1935 |
| 2,620,611 | Russell | Dec. 9, 1952 |
| 2,659,188 | Haban | Nov. 17, 1953 |
| 2,786,317 | Lundell | Mar. 26, 1957 |
| 2,795,913 | Skromme et al. | June 18, 1957 |
| 2,827,745 | Taylor | Mar. 25, 1958 |